United States Patent
Mitsuji et al.

(10) Patent No.: US 6,268,429 B1
(45) Date of Patent: *Jul. 31, 2001

(54) AQUEOUS COATING AND METHOD FOR FILM FORMATION USING THE SAME

(75) Inventors: Masaru Mitsuji, Zama; Nobushige Numa, Ebina; Yugen Kawamoto, Hiratsuka, all of (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/482,001

(22) Filed: Jan. 13, 2000

Related U.S. Application Data

(63) Continuation of application No. 09/010,806, filed on Jan. 22, 1998, now Pat. No. 6,060,554.

(30) Foreign Application Priority Data

Jan. 24, 1997 (JP) ........................................................ 9-24473

(51) Int. Cl.[7] .................................................. C08L 67/02
(52) U.S. Cl. ............................................................ 524/515
(58) Field of Search ................................................ 524/515

(56) References Cited

U.S. PATENT DOCUMENTS

| | | | |
|---|---|---|---|
| 4,048,252 | 9/1977 | Behmel et al. | 260/850 |
| 4,132,687 | 1/1979 | Behmel et al. | 260/22 A |
| 5,284,900 | 2/1994 | Izubayashi | 524/492 |
| 5,585,146 | 12/1996 | Uenaka et al. | 427/407.1 |
| 5,756,221 | 5/1998 | Horibe | 428/626 |
| 5,824,424 | * 10/1998 | Haneishi | 428/626 |

* cited by examiner

*Primary Examiner*—Paul R. Michl
(74) *Attorney, Agent, or Firm*—Wenderoth, Lind & Ponack, L.L.P.

(57) ABSTRACT

The present invention provides an aqueous coating comprising:

(A) a resin having hydroxyl group and carboxyl group in the molecule, (B) an alkyl-etherified methylolmelamine resin, and (C) an oxazoline group-containing compound.

This aqueous coating can alleviate the problems of conventional aqueous coatings comprising (a) a resin having hydroxyl group and carboxyl group and (b) an alkyl-etherified methylolmelamine resin.

16 Claims, No Drawings

AQUEOUS COATING AND METHOD FOR FILM FORMATION USING THE SAME

This application is a continuation of Ser. No. 09/010,806 filed Jan. 22, 1998, now U.S. Pat. No. 6,060,554.

The present invention relates to an aqueous coating and a method for film formation using the aqueous coating.

There are known an aqueous coating comprising (a) a base resin having hydroxyl group and carboxyl group and (b) an alkyl-etherified methylolmelamine resin, and a method for film formation which comprises applying a powder coating on the uncured film of the above aqueous coating to form thereon a film of the powder coating and then heating the two films to cure them simultaneously (see U.S. Pat. No. 5,585,146).

When the above aqueous coating film and powder coating film are heated for simultaneous curing, however, the aqueous coating film gives rise to a reaction between the hydroxyl group and the alkyl ether group and generates an alcohol. This alcohol passes through the molten powder coating film, vaporizes into the air, allows the powder coating film to have depressions, popping, craters, etc., and consequently reduces the surface smoothness, distinctness of image gloss, physical performance of film, other properties, etc. of the powder coating film. Further, when the aqueous coating film contains a fake-like metallic pigment, the alignment of the metallic pigment is disturbed and the metallic feeling thereof is reduced.

The present inventors made a study in order to eliminate the above-mentioned problems caused by the alcohol generated as a by-product in heat-curing an aqueous coating comprising (a) a base resin having hydroxyl group and carboxyl group and (b) an alkyl-etherified methylolmelamine resin. As a result, the present inventors found out that by using an oxazoline group-containing compound in combination with the alkyl-etherified methylolmelamine, the amount of the alcohol generated as a by-product can be reduced and the above-mentioned problems can be alleviated. The present invention has been completed based on the above finding.

The present invention provides an aqueous coating (this coating is hereinafter referred to as the present invention coating) comprising:

(A) a resin having hydroxyl group and carboxyl group in the molecule, (B) an alkyl-etherified methylolmelamine resin, and (C) an oxazoline group-containing compound.

The present invention also provides a method for multi-layered film formation (this method is hereinafter referred to as the present invention method), which comprises applying a powder coating or a powder slurry on the uncured film of an aqueous coating, to form thereon a film of the powder coating or powder slurry and then heating the two films to cure them simultaneously, wherein the aqueous coating is the present invention coating mentioned above.

The present invention coating and the present invention method are described in detail below.

RESIN (A) HAVING HYDROXYL GROUP AND CARBOXYL GROUP IN THE MOLECULE

The resin (A) used in the present invention coating is preferably an acrylic resin, a polyester resin or the like, each having hydroxyl group and carboxyl group in the molecule. The acrylic resin can be obtained by copolymerizing a hydroxyl group-containing unsaturated monomer, a carboxyl group-containing unsaturated monomer, an acrylic unsaturated monomer and, as necessary, other unsaturated monomer.

The hydroxyl group-containing unsaturated monomer is a compound having at least one hydroxyl group and at least one polymerizable unsaturated bond in the molecule and it includes, for example, $C_{2-20}$-hydroxyalkyl (meth)acrylates such as hydroxyethyl (meth)acrylate, hydroxypropyl (meth) acrylate, hydroxybutyl (meth)acrylate and the like. The carboxyl group-containing unsaturated monomer is a compound having at least one carboxyl group and at least one polymerizable unsaturated bond in the molecule and it includes, for example, monocarboxylic acids such as acrylic acid, methacrylic acid and the like; and dicarboxylic acids and modified products thereof, such as maleic acid, itaconic acid, fumaric acid, mesaconic acid, anhydrides thereof and half-esterified products thereof. As the acrylic unsaturated monomer, there can be used a $C_{1-22}$-alkyl (meth)acrylates such as methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate, octyl methacrylate, lauryl acrylate, lauryl methacrylate, 2-ethylhexyl acrylate, 2-ethylhexyl methacrylate and the like.

The other unsaturated monomer used as necessary is a polymerizable unsaturated bond-containing compound other than the above-mentioned compounds. It includes, for example, $C_{2-18}$-alkoxyalkyl (meth)acrylates such as methoxybutyl acrylate, methoxybutyl methacrylate, methoxyethyl acrylate, methoxyethyl methacrylate and the like; amino(meth)acrylic monomers such as N,N-dimethylaminoethyl acrylate, N,N-dimethylaminoethyl methacrylate, N,N-diethylaminoethyl acrylate, N,N-diethylaminoethyl methacrylate, N-t-butylaminoethyl acrylate, N-t-butylaminoethyl methacrylate, N,N-dimethylaminopropyl acrylate, N,N-dimethylaminopropyl methacrylate and the like; (meth)acrylamide type monomers such as acrylamide, methacrylamide, N-methylacrylamide, N-methylmethacrylamide, N-ethylacrylamide, N-ethylmethacrylamide, N-butylacrylamide, N-butylmethacrylamide, N-dimethylacrylamide, N-dimethylmethacrylamide and the like; glycidyl group-containing monomers such as glycidyl acrylate, glycidyl methacrylate and the like; vinyl aromatic compounds such as styrene, α-methylstyrene, vinyltoluene and the like; acrylonitrile; vinyl acetate; and vinyl chloride.

The acrylic resin can be produced by polymerizing these monomers by an ordinary process such as solution polymerization, emulsion polymerization or the like.

The acrylic resin may be any of a water-soluble acrylic resin and a water-dispersible acrylic resin. However, combined use of a water-soluble acrylic resin and a water-dispersible acrylic resin is preferable because such use can prevent the unevenness of metallic pigment in film, sagging, etc. and further can enhance the intercoat adhesion between acrylic resin film (film of the aqueous coating of the present invention) and film of powder coating or powder slurry, the water resistance of final film, etc.

The water-soluble acrylic resin is an acrylic resin which is readily soluble in water when neutralized by a method described later. It preferably has a number-average molecular weight of 5,000–100,000, particularly 15,000–80,000; a hydroxyl value of 20–200 mg KOH/g, particularly 40–150 mg KOH/g; and an acid value of 10–150 mg KOH/g, particularly 20–100 mg KOH/g.

The water-dispersible acrylic resin is an acrylic resin which, when neutralized by a method described later, is not readily soluble in water but is stably dispersible in water in fine particles. It preferably has a number-average molecular weight of 150,000 or more, particularly 200,000–3,000,000; a hydroxyl value of 20–200 mg KOH/g, particularly 40–150 mg KOH/g; and an acid value of 10–100 mg KOH/g, particularly 20–80 mg KOH/g. The water-dispersible acrylic resin can be produced, for example, by emulsion polymerization or by solution polymerization in organic solvent and subsequent dispersion of resulting polymer in water.

Herein, "water-soluble resin" and "water-dispersible resin" is determined as follows. A finely ground resin powder is placed in water of 20° C. so that the solid content becomes 10% by weight; the resin powder is neutralized with a base of equivalent amount; the resulting material is stirred thoroughly for 10 minutes and then is put in a colorless transparent beaker placed on a white paper having a black letter printed thereon with a No. 4 type, so that the height of the material in the beaker becomes 5 cm; and the letter is seen from above the material surface. When the letter is readable clearly, the resin is judged as "water-soluble resin". When the letter is not readable but the resin is stably dispersed and gives no precipitate, the resin is judged as "water-dispersible resin".

When the water-soluble acrylic resin and the water-dispersible resin are used in combination, there is no particular restriction as to their mixing proportions. However, it is generally preferable that the water-soluble resin is used in a proportion of 80–20% by weight, particularly 60–30% by weight and the water-dispersible resin is used in a proportion of 20–80% by weight, particularly 40–70% by weight, all based on the total solid content of the two resins.

The polyester resin can be obtained by an esterification reaction between a polybasic acid and a polyhydric alcohol. The polybasic acid includes, for example, phthalic acid, isophthalic acid, terephthalic acid, succinic acid, adipic acid, azelaic acid, sebacic acid, tetrahydrophthalic acid, hexahydrophthalic acid, HET acid, maleic acid, itaconic acid, trimellitic acid and anhydrides thereof. The polyhydric alcohol includes, for example, ethylene glycol, propylene glycol, butylene glycol, hexanediol, diethylene glycol, dipropylene glycol, neopentyl glycol, triethylene glycol, glycerine, trimethylolethane, trimethylolpropane and pentaerythritol.

The introduction of hydroxyl group into the polyester resin can be conducted generally by using a trihydric or higher alcohol as part of the above-mentioned polyhydric alcohol component. By, for example, half-esterifying the above-mentioned polybasic acid with part of the thus-introduced hydroxyl group, carboxyl group can be introduced into the polyester resin.

The polyester resin may be a polyester resin which becomes water-soluble or water-dispersible when neutralized according to a conventional method. However, it is preferable to use a polyester resin which can form a stable aqueous dispersion of fine particles when neutralized (this polyester resin is hereinafter referred to as water-dispersible polyester resin), because the water-dispersible polyester resin can prevent the unevenness of metallic pigment in film, sagging, etc. The water-dispersible polyester resin usable in the present invention, preferably has a number-average molecular weight of 2,000–100,000, particularly 3,000–80,000; a hydroxyl value of 30–120 mg KOH/g, particularly 50–80 mg KOH/g; and an acid value of 15–100 mg KOH/g, particularly 30–50 mg KOH/g.

In the present invention coating, the resin (A) component is made water-soluble or water-dispersible before or after mixing with other components, by neutralizing part or the whole of the carboxyl group present in the resin.

As the neutralizing agent (base) used therefor, there can be mentioned, for example, alkali metal hydroxides or alkaline earth metal hydroxides such as sodium hydroxide, potassium hydroxide, lithium hydroxide, calcium hydroxide, barium hydroxide and the like; ammonia; primary monoamines such as ethylamine, propylamine, butylamine, benzylamine, monoethanolamine, neopentanolamine, 2-amino-2-methylpropanol, 2-aminopropanol, 3-aminopropanol and the like; secondary monoamines such as diethylamine, diethanolamine, di-n- or di-iso-propanolamine, N-methylethanolamine, N-ethylethanolamine and the like; tertiary monoamines such as dimethylethanolamine, trimethylamine, triethylamine, triisopropylamine, methyldiethanolamine, dimethylaminoethanol and the like; and polyamines such as diethylenetriamine, hydroxyethylaminoethylamine, ethylaminoethylamine, methylaminopropylamine and the like.

ALKYL-ETHERIFIED METHYLOLMELAMINE RESIN (B)

The resin (B) used in the present invention coating is a component for giving rise to a crosslinking reaction with the resin (A), and is a partially or completely etherified methylolmelamine resin which is obtained by etherifying part or the whole of the methylol group of a partially or completely methylated melamine resin with a $C_{1-8}$ alkanol such as methanol, ethanol, propanol, butanol or the like. It preferably has 1–5 triazine rings in the molecule and a molecular weight of 300–3,000, particularly 500–2,000. The resin (B) may be water-soluble or water-insoluble.

OXAZOLINE GROUP-CONTAINING COMPOUND (C)

The oxazoline group-containing compound (C) used in the present invention coating includes, for example, a polymeric compound (C-1) having at least two oxazoline groups at the side chains and a monomeric compound (C-2) having at least two oxazoline groups in the molecule. Herein, the oxazoline group is a group represented by the following formula:

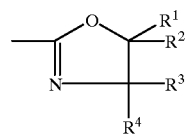

wherein $R^1$, $R^2$, $R^3$ and $R^4$ are each independently a hydrogen atom or a $C_{1-20}$ alkyl group.

The polymeric compound (C-1) can be obtained by polymerizing an oxazoline group-containing polymeric unsaturated monomer (C-1a) and, as necessary, other polymerizable unsaturated monomer (C-1b).

The monomer (C-1a) is a compound having, in the molecule, at least one oxazoline group and at least one polymerizable unsaturated bond. It includes, for example, 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline.

The monomer (C-1b) is a compound other than the monomer (C-1a), having at least one polymerizable unsaturated bond in the molecule. As the monomer (C-1b), there can be used at least one monomer selected from the unsaturated monomers mentioned in the production of the resin (A).

In the polymeric compound (C-1), the preferable content of the monomer (C-1a) is 1–100%, particularly 10–60%, more particularly 20 to 50% based on the total weight of the monomer (C-1a) and the monomer (C-1b). The preferable number-average molecular weight of the polymeric compound (C-1) is about 500–100,000, particularly about 1,000–50,000, more particularly 3,000–30,000. The polymerization of the monomer (C-1a) and the monomer (C-1b) can be conducted by ordinary solution polymerization or the like. The resulting polymeric compound (C-1) may be either water-soluble or water-dispersible.

Meanwhile, as the monomeric compound (C-2), there can be mentioned, for example, 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline), bis-(2-oxazolinylcyclohexane) sulfide and bis-(2-oxazolinylnorbornane) sulfide. These monomers can be used singly or in combination of two or more monomers.

The oxazoline group of the compound (C) reacts with the carboxyl group of the resin (A) to form an amide ester bond; as a result, the two components (A) and (C) are crosslinked and cured three-dimensionally. This curing reaction is a ring-opening reaction of oxazoline group and generates no by-product; consequently, there occur no problems mentioned above, caused by by-product, such as generation of depressions, popping, craters, etc. and reduction in distinctness of image gloss, smoothness and metallic feeling of coating film. In the present invention coating, since the carboxyl group of the resin (A) is completely or almost completely neutralized with a neutralizing agent and blocked thereby, substantially no reaction takes place between the carboxyl group and the oxazoline group of the compound (C), before the application of the present invention coating. However, once the present invention coating is applied and heated to cure the resulting film, the neutralizing agent is evaporated; the above-mentioned blocking is removed; carboxyl group is regenerated; and this carboxyl group is crosslinked and cured with the oxazoline group. Meanwhile, the resin (B) reacts with the hydroxyl group of the resin (A) and takes part in the crosslinking and curing of coating film. In this case, since the present invention coating contains the compound (C) as one component, the amount of the resin (B) used can be made small as compared with that in the conventional aqueous coating and, as a result, the amount of the by-product generated, during curing, by the reaction of the resin (A) and the resin (B) can be controlled at a low level.

PRESENT INVENTION COATING

The present invention coating can be produced by dissolving or dispersing the above-mentioned components (A), (B) and (C) in an aqueous medium, for example, water.

The proportions of the components (A), (B) and (C) can be varied over a wide range depending upon, for example, the application of the present invention coating. However, it is generally preferable that the proportion of the component (A) is 90–50%, particularly 85–60%, more particularly 80–65%, the proportion of the component (B) is 3–25%, particularly 5–20%, more particularly 5–15% and the proportion of the component (C) is 5–30%, particularly 5–20%, more particularly 10–20%, all based on the total solid weight of the three components.

The present invention coating can further comprise, besides the components (A), (B) and (C), a coloring pigment, a metallic pigment, an iridescent pigment, an extender pigment, an organic solvent, a catalyst, an antisetting agent, an ultraviolet absorber, etc.

The present invention coating is an aqueous coating and can be used as a primer, an intermediate coating or a top coat (a solid color coating, a metallic coating, an iridescent coating or a clear coating).

METHOD OF APPLICATION

The present invention coating can be used in primer coating, intermediate coating or top coating, depending upon the composition.

Top coating is conducted usually, for example, by a 1-coat method which comprises applying, on a material to be coated, obtained by applying a primer and optionally an intermediate coating on a substrate, a coloring coating (e.g. a solid color coating, a metallic coating or an iridescent coating), or a 2-coat method which comprises applying a clear coating on the film of said coloring coating, or a 3-coat method which comprises applying, on the film of said coloring coating, a color transparent coating and a clear coating in this order. The present invention coating can be used according to any of these methods. However, it is particularly preferable to use the present invention coating according to a 2-coat 1-bake method (2C1B) which comprises applying the present invention coating in the form of a solid color coating, a metallic coating or an iridescent coating, applying, on the resulting uncured film, a powder coating or a powder slurry to form its uncured film, and heating the two uncured films to simultaneously cure them, because this approach can fully utilize the meritorious effects of the present invention coating.

Hence, according to the present invention there is also provided a method for multilayered film formation by 2C1B (the method is hereinafter referred to as the present invention method), which comprises applying a powder coating or a powder slurry on the uncured film of an aqueous coating, to form thereon a film of the powder coating or powder slurry and then heating the two films to cure them simultaneously, wherein the aqueous coating is the present aqueous coating.

In the conventional 2C1B film formation method, there has been used an aqueous coating comprising, as the main components, a hydroxyl group-containing resin and an alkyl-etherified melamine resin. When this aqueous coating is applied and heated, the two components give rise to a crosslinking and curing reaction and liberates (generates) an alcohol as a by-product; the alcohol is evaporated while the upper layer film (powder coating film) is molten, and allows said film to have depressions, popping, craters, etc., inviting reduction in smoothness, distinctness of image gloss, properties, etc. of film. In the present invention method, all of such problems are alleviated.

The powder coating used in the present invention method can be a per se known powder coating. Specific examples thereof include a thermosetting powder coating comprising a resin composition composed of (a) a thermosetting base resin powder which is melted and fluidized when heated and (b) a curing agent. The powder coating can further comprise, as necessary, a coloring pigment, a metallic pigment, an iridescent pigment, an extender pigment, a catalyst, a flow-controlling agent, an ultraviolet absorber, a light stabilizer, an anti-cissing agent, etc.

As the thermosetting base resin powder (a), there can be used a resin having functional group which reacts with the curing agent when heated. Specific examples thereof are an acrylic resin, a polyester resin, a fluororesin, a urethane resin and modified resins thereof (e.g. graft polymers) all having, in the molecule, at least two same or different functional groups selected from carboxyl group, hydroxyl group, blocked or unblocked isocyanate group, epoxy group, etc. These resins preferably have a glass transition temperature (Tg) of usually 50° C. or more, particularly 60–120° C. As the curing agent (b), there is used a curing agent reactive with the above-mentioned functional groups to form a cured film. There can be used, for example, a curing agent such as amino group-containing amino resin (e.g. alkoxylated melamine resin), blocked polyisocyanate compound (e.g. caprolactam-blocked polyisocyanate) or the like to a hydroxyl group-containing base resin; a curing agent such as polyepoxide (e.g. triglycidyl isocyanurate) or the like to a carboxyl group-containing base resin; a curing agent such as polycarboxylic acid (e.g. dodecanedioic acid or trimellitic acid), β-hydroxyethylalkylamide or the like to an epoxy group-containing base resin; and a curing agent such as polyol (e.g. trimethylolpropane) or the like or an epoxy polymerization initiator such as benzyl-4-hydroxyphenylmethylsulfonium hexafluoroantimonate or the like to a blocked isocyanate group-containing base resin.

The powder coating is obtained by dry-blending the above components by the use of a mixer, melt-kneading the resulting blend with heating, and subjecting the resulting melt to cooling, coarse grinding, fine grinding and filtration. The powder coating preferably has an average particle diameter of generally 5–50 μm, particularly 8–30 μm.

The powder slurry is a dispersion of the above powder coating in an aqueous medium, for example, water and can contain the powder coating in an amount of generally 20–50% by weight, preferably 25–45% by weight based on the weight of the slurry. The powder slurry can further contain, as necessary, a dispersing agent, a viscosity-controlling agent, an antifoaming agent, etc.

The present invention method comprises applying a powder coating or a powder slurry on the uncured film of the present invention coating and then heating both of the uncured film of the present invention coating and the resulting uncured film of the powder coating or the powder slurry to simultaneously cure them. The present invention method is particularly suitable for use as a 2-coat 1-bake (2C1B) method of applying the present invention coating of solid color type, metallic type, iridescent type or the like to form an uncured film, applying thereon a powder coating or a powder slurry both capable of forming a clear film, to form an uncured film of the powder coating or powder slurry, and then heating the two films to simultaneously cure them.

In this 2C1B, the present invention coating can be applied directly on a metallic or plastic substrate such as automobile body or the like, or after said substrate has been coated with a primer (e.g. a cationic electrocoating) and optionally an intermediate coating and then the resulting film(s) has (have) been cured. Specifically, the present invention coating is adjusted so as to have a solid content and a viscosity both suitable for application, i.e. a solid content of 10–60% by weight, preferably 20–40% by weight and a viscosity of 600–6,000 cp, preferably 800–3,000 cp as measured by a B type viscometer; the resulting coating is applied on the above substrate by spray coating such as airless spraying, air spraying, electrostatic coating or the like in a film thickness (as cured) of 10–60 μm, preferably 10–40 μm; the resulting film is allowed to stand at room temperature for about 1–10 minutes or dried at about 50–100° C. for about 1–10 minutes; thereon is applied a powder coating by electrostatic powder coating, triboelectrification powder coating or the like, or a powder slurry by airless spraying, air spraying, electrostatic coating or the like, in a film thickness (as cured) of 20–200 μm, preferably 20–80 μm; the two films are heated at about 120–180 C. for about 10–50 minutes to cure them simultaneously; thereby, the present invention method can be carried out.

It is presumed that the present invention coating, when subjected to film curing, gives rise to two reactions, i.e. (1) an alcohol-removing (generating) reaction between the hydroxyl group of the component (A) and the alkyl ether group of the component (B) and (2) a ring-opening amide esterification reaction between the carboxyl group of the component (A) and the oxazoline group of the component (C). Therefore, when the present invention coating is used, as compared with when a conventional aqueous coating containing the component (A) and the component (B) is used [in the latter case, curing takes place only by the alcohol-removing reaction between the component (A) and the component (B)], an amount of the component (B) to be used can be reduced and thus the amount of the alcohol removed (generated) becomes small; consequently, the above-mentioned problems caused by the alcohol-removing (generating) reaction are alleviated and the occurrence of depressions, popping, craters, etc. during the period of melting and curing of the upper layer film of powder coating is significantly reduced; thereby, it is possible to form a multilayered coating film excellent in smoothness, distinctness of image gloss, metallic feeling, physical properties, etc.

The present invention is described specifically below by way of Examples and Comparative Examples. Incidentally, in the followings, parts and % are by weight in all cases.

PREPARATION OF SAMPLES

(1) Material to be Coated

On a 0.8 mm-thick dull steel plate subjected to a zinc phosphate treatment was electrodeposited an epoxy type cationic electrocoating in a film thickness (as cured) of about 20 μm, followed by baking at 170° C. for 20 minutes. The resulting film was ground with a #400 sand paper and wiped with petroleum benzine for degreasing. Thereon was applied, by air spraying, a primer surfacer (polyester resin-melamine resin type) for use in automobile, in a film thickness (as cured) of about 25 μm. The resulting film was cured at 140° C. for 30 minutes, water sanding with a #400 sand paper and, subjected to water drainage and drying, and wiped with petroleum benzine for degreasing, to obtain a material to be coated, to be used in Examples 5–12 and Comparative Examples 3–6.

(2) Resins (A) Having Hydroxyl Group and Carboxyl Group in the Molecule (A-1): Water-soluble acrylic resin To butyl cellosolve kept at 115° C. were added 16.7 parts of n-butyl acrylate, 15 parts of methyl methacrylate, 30 parts of styrene, 20 parts of 2-ethylhexyl acrylate, 12 parts of hydroxyethyl methacrylate, 6.3 parts of acrylic acid and 1 part of azoisobutyronitrile. The mixture was subjected to a polymerization reaction under ordinary conditions. The resulting acrylic resin had an acid value of 50 mg KOH/g, a hydroxyl value of 50 mg KOH/g and a number-average molecular weight of 45,000. The carboxyl group of the acrylic resin was neutralized with the same equivalent of dimethylaminoethanol to obtain an aqueous acrylic resin solution (A-1) having a solid content of 55%.

(A-2): Water-dispersible acrylic resin

In a reactor were placed 140 parts of deionized water, 2.5 parts of 30% Newcol 707SF (trade name, a surfactant manufactured by Nippon Nyukazai Co., Ltd.) and 1 part of a monomer component 1 (see Note 1) shown below, followed by mixing in a nitrogen current. Thereto was added 3 parts of a 3% aqueous ammonium persulfate solution at 60° C. The resulting mixture was heated to 80° C. Thereto was added, in 4 hours by the use of a metering pump, a monomer emulsion consisting of 79 parts of the monomer component 1 (see Note 1), 2.5 parts of 30% Newcol 707SF, 4 parts of a 3% aqueous ammonium persulfate solution and 42 parts of deionized water. Then, the resulting mixture was subjected to aging for 1 hour.

Thereto were dropwise added, at 80° C., 20.5 parts of a monomer component 2 (see Note 2) shown below and 4 parts of a 3% aqueous ammonium persulfate solution simultaneously in parallel in 5 hours. The resulting mixture was subjected to aging for 1 hour, then diluted with 30 parts of deionized water, and filtered through a 200-mesh nylon cloth at 30° C. The filtrate was mixed with deionized water and adjusted to pH 7.5 with dimethylaminoethanolamine to obtain an acrylic resin emulsion (A-2) having an average particle diameter of 0.1 μm and a nonvolatile content of 20%. The acrylic resin had an acid value of 9 mg KOH/g and a hydroxyl value of 5 mg KOH/g.

(Note 1) Monomer component 1

Consisted of 55 parts of methyl methacrylate, 8 parts of styrene, 9 parts of n-butyl acrylate, 5 parts of 2-ethylhexyl acrylate, 2 parts of 1,6-hexanediol diacrylate and 1 part of methacrylic acid.

(Note 2) Monomer component 2

Consisted of 5 parts of methyl methacrylate, 7 parts of n-butyl acrylate, 5 parts of 2-hydroxyethyl acrylate, 3 parts of methacrylic acid and 0.5 part of 30% Newcol 707SF.

(A-3): Water-dispersible polyester resin

In a reactor were placed 0.7 mole of neopentyl glycol, 0.3 mole of trimethylolpropane, 0.4 mole of phthalic anhydride and 0.5 mole of adipic acid. They were reacted at 200–230° C. for 5 hours. Thereto was added 0.03 mole of trimellitic anhydride. The resulting mixture was reacted at 180° C. for 1 hour. Thereto was added butyl cellosolve to obtain a polyester resin solution having a nonvolatile content of 70%. The polyester resin had an acid value of 40 mg KOH/g, a hydroxyl value of 70 mg KOH/g and a number-average molecular weight of about 6,000. The polyester resin solution was neutralized with dimethylaminoethanol of equivalent amount and mixed with deionized water to obtain a polyester emulsion (A-3) having a solid content of 35%.

(3) Alkyl-etherified Melamine Resins (B)

(B-1): Partially methyl-etherified methylolmelamine resin "Cymel 325" (trade name, a product of Mitsui Cyanamid Ltd.

(B-2): Butyl-etherified methylolmelamine resin "U-ban 28-60" (trade name, a product of Mitsui Toatsu Chemicals, Inc.)

(4) Oxazoline Group-Containing Compounds (C)

(C-1): Aqueous solution of oxazoline group-containing polymer 45 parts of 2-isopropenyl-2-oxazoline, 20 parts of methyl methacrylate, 20 parts of butyl methacrylate and 15 parts of RMA-450M (see Note 3) were subjected to a polymerization reaction under ordinary conditions to obtain an oxazoline group-containing polymer. An aqueous oxazoline group-containing polymer solution (C-1) was obtained which consisted of 40 parts (as solid content) of the oxazoline group-containing polymer obtained above, 38 parts of propylene glycol monomethyl ether and 22 parts of water. The solution had a viscosity of 800 cp at 20° C. and pH 7–9. The polymer had a number-average molecular weight of 23,000.

(Note 3) RMA-450M

Trade name and a product of Nippon Nyukazai Co., Ltd., i.e. a polyoxyethylene macromonomer wherein about 45 oxyethylene units are bonded to each other and the one terminal is a methacrylate bond.

(C-2): Emulsion of oxazoline group-containing polymer 18 parts of 2-isopropenyl-2-oxazoline, 12 parts of methyl methacrylate, 40 parts of butyl methacrylate and 30 parts of styrene were subjected to a polymerization reaction under ordinary conditions to obtain an oxazoline group-containing polymer. An aqueous oxazoline group-containing polymer dispersion (C-2) was obtained which consisted of 40 parts (as solid content) of the oxazoline group-containing polymer obtained above and 60 parts of water. The dispersion had a viscosity of 100 cp at 20° C. and pH 8.7. The polymer had a number-average molecular weight of 150,000.

EXAMPLES 1–4 AND COMPARATIVE EXAMPLES 1–2

The components obtained above were mixed in various proportions shown in Table 1, to prepare blue metallic aqueous coatings. The proportions in Table 1 are based on solid content by weight.

TABLE 1

| Components | Examples | | | | Comparative Examples | |
|---|---|---|---|---|---|---|
|  | 1 | 2 | 3 | 4 | 1 | 2 |
| (A-1) | 45 | 45 | 45 | 45 | 45 | 45 |
| (A-2) | 30 |  | 30 | — | 30 |  |
| (A-3) |  | 30 |  | 30 | — | 30 |
| (B-1) | 15 | 15 |  |  | 25 |  |
| (B-2) |  |  | 15 | 15 |  | 25 |
| (C-1) | 10 | 10 |  |  | — | — |
| (C-2) |  |  | 10 | 10 | — | — |
| Metallic pigment (Note 4) | 10 | 10 | 10 | 10 | 10 | 10 |
| Blue organic pigment (Note 5) | 2 | 2 | 2 | 2 | 2 | 2 |

(Note 4) The metallic pigment was "Alpaste 7680" (trade name, a product of Toyo Aluminum K.K.).
(Note 5) The blue organic pigment was "Heliogen Blue L6900" (trade name, Cyanine Blue manufactured by BASF).

EXAMPLES 5–8 AND COMPARATIVE EXAMPLES 3–4

Each of the aqueous coatings obtained in Examples 1–4 and Comparative Examples 1–2 was adjusted so as to have a viscosity of 45 seconds (Ford Cup #4 at 20° C.); was applied on the above-prepared material to be coated, by air spraying in a film thickness (as cured) of 15±3 μm; and was dried at 70° C. for 10 minutes to form an uncured film. On this uncured film was applied a powder coating (see Note 6) capable of forming a clear film, in a film thickness (as cured) of about 60 μm to form a film of the powder coating. Then, the two films were heated at 160° C. for 30 minutes to simultaneously cure them. The thus-formed multilayered film was tested for properties and the results are shown in Table 2.

(Note 6) Powder coating

There were uniformly mixed 80 parts of an acrylic resin ("Finedic A207S", trade name, an epoxy-functional acrylic resin manufactured by Dainippon Ink and Chemicals, Inc.), 20 parts of dodecanedioic acid and 0.5 part of benzoin. The mixture was melt-kneaded, cooled and then finely ground to obtain a powder clear coating having a particle diameter of 20–50 μm.

TABLE 2

| | Examples | | | | Comparative Examples | |
|---|---|---|---|---|---|---|
| | 5 | 6 | 7 | 8 | 3 | 4 |
| Aqueous coating | Examples | | | | Comparative Examples | |
| | 1 | 2 | 3 | 4 | 1 | 2 |
| Popping | ○ | ○ | ○ | ○ | × | × |
| IV | 274 | 280 | 272 | 282 | 249 | 236 |
| F/F | 1.66 | 1.69 | 1.66 | 1.68 | 1.60 | 1.58 |
| Water resistance | ○ | ○ | ○ | ○ | ○ | ○ |
| Gasoline resistance | ○ | ○ | ○ | ○ | Δ | Δ |

Properties of film were tested as follows.

POPPING

The surface of film was visually observed to examine the presence or absence of depressions, projections, etc. caused by foaming, etc. The film surface condition was rated according to the following standard.

○: The film surface is free from depressions, projections, etc. and has good smoothness.

Δ: Depressions, projections, etc. are seen slightly and the surface smoothness is slightly inferior.

X: Depressions, projections, etc. are seen noticeably and the surface smoothness is very inferior.

FINISH

IV and flip-flop property (F/F) were measured by the use of ALCOPE LMR-100 (trade name, a product of FUJI INDUSTRY LTD.). IV is an indication of the whiteness of aluminum flake in coating film; aluminum flake present in a coating film, when oriented parallel to the film surface, looks white and its IV is high. Flip-flop property (F/F) indicates the degree of change of glittering feeling of coating film surface when the surface is viewed from various angles; when aluminum flake is oriented, in a coating film, parallel to the film surface, the glittering feeling of the film surface changes greatly only by slight change of viewing angle and a high F/F is recorded.

WATER RESISTANCE

A test piece was immersed in water of 40° C. for 10 days, after which the film surface was observed visually. The water resistance of the test piece was rated according to the following standard.

○: The film surface is free from blister, whitening, etc.

Δ: Blister, whitening, etc. are seen slightly.

X: Blister, whitening, etc. are seen noticeably.

GASOLINE RESISTANCE

A test piece was immersed in a regular gasoline at room temperature for 2 hours, after which the film surface was observed visually. The gasoline resistance of the test piece was rated according to the following standard.

○: The film surface is free from blister, reduction in gloss, etc.

Δ: Blister and reduction in gloss are seen slightly.

X: Blister and reduction in gloss are seen noticeably.

EXAMPLES 9–12 and COMPARATIVE EXAMPLES 5–6

Each of the aqueous coatings obtained in Examples 1–4 and Comparative Examples 1–2 was adjusted so as to have a viscosity of 45 seconds (Ford Cup #4 at 20° C.); was applied on the above-prepared material to be coated, by air spraying in a film thickness (as cured) of 15±3 μm; and was dried at 70° C. for 10 minutes to form an uncured film. On this uncured film was applied a powder slurry coating (see Note 7) capable of forming a clear film, in a film thickness (as cured) of 60 μm to form a film of the powder slurry coating. Then, the two films were heated at 160° C. for 30 minutes to simultaneously cure them. The thus-formed multilayered film was tested for properties according to the same test methods as used above, and the results are shown in Table 3.

(Note 7) Powder slurry coating 80 parts of an acrylic resin (Finedic A207S), 20 parts of dodecanedioic acid and 0.5 part of benzoin were uniformly mixed, melt-kneaded, cooled, and finely ground so as to have particle diameters of 20–50 μm, whereby a powder composition was obtained. 68 parts of the powder composition was mixed with 100 parts of deionized water, 1 part of a dispersing agent (Disperbyk-182, a product of BYK Chemie Co.) and 0.6 part of a rheology-adjusting agent (Acrysol ASE-60, a product of Rohm & Haas Co.) to obtain a powder slurry coating.

TABLE 3

| | Examples | | | | Comparative Examples | |
|---|---|---|---|---|---|---|
| | 9 | 10 | 11 | 12 | 5 | 6 |
| Aqueous coating | Examples | | | | Comparative Examples | |
| | 1 | 2 | 3 | 4 | 1 | 2 |
| Popping | ○ | ○ | ○ | ○ | × | × |
| IV | 275 | 279 | 271 | 281 | 249 | 235 |
| F/F | 1.66 | 1.68 | 1.68 | 1.69 | 1.60 | 1.57 |
| Water resistance | ○ | ○ | ○ | ○ | ○ | ○ |
| Gasoline resistance | ○ | ○ | ○ | ○ | Δ | Δ |

What is claimed is:

1. An aqueous coating comprising:
    (A) a resin having hydroxyl group and carboxyl group in the molecule,
    (B) an alkyl-etherified methylolmelamine resin, and
    (C) an oxazoline group-containing compound.

2. An aqueous coating according to claim 1, wherein the component (A) is an acrylic resin or a polyester resin each having hydroxyl group and carboxyl group in the molecule.

3. An aqueous coating according to claim 2, wherein the acrylic resin is a combination of a water-soluble acrylic resin and a water-dispersible acrylic resin.

4. An aqueous coating according to claim 3, wherein the acrylic resin consists of 80–20% by weight, based on the total resin solid content, of a water-soluble acrylic resin and 20–80% by weight, based on the same solid content, of a water-dispersible acrylic resin.

5. An aqueous coating according to claim 3, wherein the water-soluble acrylic resin has a number-average molecular weight of 5,000–100,000, a hydroxyl value of 20–200 mg KOH/g and an acid value of 10–150 mg KOH/g.

6. An aqueous coating according to claim 3, wherein the water-dispersible acrylic resin has a number-average molecular weight of 150,000 or more, a hydroxyl value of 20–200 mg KOH/g and an acid value of 10–100 mg KOH/g.

7. An aqueous coating according to claim 2, wherein the polyester resin is a water-dispersible polyester resin.

8. An aqueous coating according to claim 7, wherein the water-dispersible polyester resin has a number-average molecular weight of 2,000–100,000, a hydroxyl value of 30–120 mg KOH/g and an acid value of 15–100 mg KOH/g.

9. An aqueous coating according to claim 1, wherein the component (B) is a partially or completely methylated melamine resin which is partially or completely etherified with a $C_{1-8}$ alkanol.

10. An aqueous coating according to claim 1, wherein the component (C) is a polymeric compound having at least two oxazoline groups at the side chains or a monomeric compound having at least two oxazoline groups in the molecule.

11. An aqueous coating according to claim 1, wherein the oxazoline group is a group represented by the following formula:

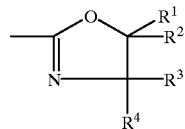

where $R^1$, $R^2$, $R^3$ and $R^4$ are each independently a hydrogen atom or a $C_{1-20}$ alkyl group.

12. An aqueous coating according to claim 10, wherein the polymeric compound having at least two oxazoline groups at the side chains is obtained by polymerizing an oxazoline group-containing polymerizable unsaturated monomer and, as necessary, other polymerizable unsaturated monomer.

13. An aqueous coating according to claim 12, wherein the oxazoline group-containing polymerizable unsaturated monomer is selected from the group consisting of 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline.

14. An aqueous coating according to claim 10, wherein the monomeric compound having at least two oxazoline groups in the molecule is selected from the group consisting of 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline), bis-(2-oxazolinylcyclohexane) sulfide and bis-(2-oxazolinylnorbornane) sulfide.

15. An aqueous coating according to claim 1, wherein the components (A), (B) and (C) are contained in amounts of 90–50%, 3–25% and 5–30%, respectively, based on the total solid weight of the three components.

16. An aqueous coating according to claim 15, wherein the components (A), (B) and (C) are contained in amounts of 85–60%, 5–20% and 5–20%, respectively, based on the total solid weight of the three components.

* * * * *